(12) United States Patent
Liu et al.

(10) Patent No.: US 11,313,773 B2
(45) Date of Patent: Apr. 26, 2022

(54) SYNTHESIS OF A TWO-SCALE STRUCTURE WITH ANISOTROPY

(71) Applicant: Wisconsin Alumni Research Foundation, Madison, WI (US)

(72) Inventors: Xingchen Liu, El Cerrito, CA (US); Vadim Shapiro, Berkeley, CA (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 1080 days.

(21) Appl. No.: 15/850,138

(22) Filed: Dec. 21, 2017

(65) Prior Publication Data

US 2019/0195760 A1 Jun. 27, 2019

(51) Int. Cl.
| | |
|---|---|
| G06F 30/20 | (2020.01) |
| B33Y 50/02 | (2015.01) |
| G01N 3/08 | (2006.01) |
| B33Y 10/00 | (2015.01) |
| B33Y 50/00 | (2015.01) |
| G06F 30/00 | (2020.01) |

(52) U.S. Cl.
CPC ............... *G01N 3/08* (2013.01); *B33Y 10/00* (2014.12); *B33Y 50/00* (2014.12); *B33Y 50/02* (2014.12); *G06F 30/00* (2020.01); *G06F 30/20* (2020.01)

(58) Field of Classification Search
CPC ......... B33Y 10/00; B33Y 50/02; B33Y 50/00; G01N 3/08; G06F 30/00; G06F 30/20
See application file for complete search history.

(56) References Cited

U.S. PATENT DOCUMENTS

| | | | | |
|---|---|---|---|---|
| 5,969,524 | A * | 10/1999 | Pierpaoli | G01R 33/56341 |
| | | | | 324/307 |
| 10,753,998 | B2 * | 8/2020 | Cetingul | G01R 33/56341 |
| 2016/0096318 | A1 * | 4/2016 | Bickel | B33Y 10/00 |
| | | | | 264/40.1 |

OTHER PUBLICATIONS

Basu, Saurabh, Zhiyu Wang, and Christopher Saldana. "Modeling Evolution of Microstructures Beneath Topographically Textured Surfaces Produced Using Shear Based Material Removal." International Manufacturing Science and Engineering Conference. vol. 49903. American Society of Mechanical Engineers, 2016.*
Hine, Peter J., Hans Rudolf Lusti, and Andrei A. Gusev. "On the possibility of reduced variable predictions for the thermoelastic properties of short fibre composites." Composites science and technology 64.7-8 (2004): 1081-1088.*
Le Ferrand, Hortense, et al. "Magnetically assisted slip casting of bioinspired heterogeneous composites." Nature materials 14.11 (2015): 1172-1179.*

(Continued)

*Primary Examiner* — Kibrom K Gebresilassie
(74) *Attorney, Agent, or Firm* — Cooper Legal Group, LLC (57) ABSTRACT

A method includes generating a plurality of reference neighborhoods from a sample material structure. Tensors are determined for each of the plurality of reference neighborhoods associated with a material property. A neighborhood orientation is determined for each of the reference neighborhoods based on the tensors. A plurality of target neighborhoods are defined for a target structure. Each target neighborhood has a target orientation associated with the material property. A synthesized structure corresponding to the target structure is generated by selecting a reference neighborhood for each target neighborhood having a neighborhood orientation matching the target orientation.

22 Claims, 7 Drawing Sheets

(56) References Cited

OTHER PUBLICATIONS

Livne, Tomer, and Dov Sagi. "Multiple levels of orientation anisotropy in crowding with Gabor flankers." Journal of vision 11.13 (2011): 18-18.*

Gümrükçüoğlu, A. Emir, Burak Himmetoglu, and Marco Peloso. "Scalar-scalar, scalar-tensor, and tensor-tensor correlators from anisotropic inflation." Physical Review D 81.6 (2010): 063528.*

Kapfer, Sebastian C., et al. "Local anisotropy of fluids using Minkowski tensors." Journal of Statistical Mechanics: Theory and Experiment Nov. 2010 (2010): P11010.*

Katunin, A., M. Danczak, and P. Kostka. "Automated identification and classification of internal defects in composite structures using computed tomography and 3D wavelet analysis." Archives of Civil and Mechanical Engineering 15.2 (2015): 436-448.*

Kolda, Tamara G. "Symmetric orthogonal tensor decomposition is trivial." arXiv preprint arXiv: 1503.01375 (2015).*

Leugering, G., and S. A. Nazarov. "The Eshelby theorem and its variants for piezoelectric media." Archive for Rational Mechanics and Analysis 215.3 (2015): 707-739.*

Phelps, Jay H., and Charles L. Tucker III. "An anisotropic rotary diffusion model for fiber orientation in short- and long-fiber thermoplastics." Journal of Non-Newtonian Fluid Mechanics 156.3 (2009): 165-176.*

Hine, Peter J., Hans Rudolf Lusti, and Andrei A. Guserv, "On the possibility of reduced variable predictions for the thermoelastic properties of short fibre composites" Composites Science and Technology, pp. 1081-1088 (Year: 2004).*

\* cited by examiner

SYNTHESIS OF A TWO-SCALE STRUCTURE WITH ANISOTROPY

This invention was made with government support under CMMI1344205 awarded by the National Science Foundation and 70NANB14H232 awarded by the National Institute of Standards & Technology. The government has certain rights in the invention.

BACKGROUND

Field of the Disclosure

The present disclosure relates generally to material analysis, and, more particularly, to the synthesis of a two-scale structure with anisotropy.

Description of the Related Art

The term "anisotropy of material" refers to the dependence of a material's properties on direction. Stiffness, for example, is one way natural or synthetic materials can be characterized by their anisotropic properties. In design, proper control of anisotropy can greatly enhance the efficiency and performance of synthesized structures. For example, aligning the stiffness of the material with the load improves the performance of the item.

Anisotropy should not be confused with heterogeneity, which is the property of being location dependent. A material can be homogeneous on the coarse scale and have its fine-scale structures being anisotropic at the same time, as is the case, for example, with carbon fiber sheets in composite manufacturing. Similar to heterogeneity, anisotropy is a property of scales, depending on the effective material property of the associated neighborhood. Many nature and man-made materials exhibit various degrees of anisotropy. For example, crystalline materials are generally anisotropic, as many of their physical properties depend on the direction of the crystal. Wood is anisotropic with a high percentage of grains being parallel to the tree trunk. The fine scale structures of bones are anisotropic with the internal architecture of the trabeculae adapting to the loads, making bones more efficient given the competing constraints in nature.

The term anisotropy has different meanings in the context of material structures. Depending on how it is measured, it could refer to geometry anisotropy, where the statistics of the structural geometry are anisotropic; or it could also refer to property anisotropy, where the physical properties of the material are anisotropic. It is widely accepted that the latter is the result of the former combined with a third type of anisotropy: the material anisotropy of the constituent phases of the fine scale material structure, which can be regarded as the property anisotropy on a finer scale.

Mankind has relied on and benefited from material anisotropy for many centuries, from using the ancient combination of straw and mud to form brick for building construction to modern day pre-stressed concrete and fibrous composites. The rapid advancement of additive manufacturing technologies eliminates many of the geometric restrictions in traditional subtractive manufacturing processes, enabling the fabrication of three-dimensional multiscale structures in place of traditional solid parts. Even though the mechanism is straightforward, most of the fine-scale structures controlling the property anisotropy of the man-made materials to date can be reasonably characterized as one-dimensional, e.g., rebar in the concrete, fiber in the composite. This is partly due to the difficulties involved in the characterization of property anisotropy of 3D material structures, and partly due to inherent complexity of the design and manufacturing of three-dimensional multi-scale structures.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

DETAILED DESCRIPTION

FIGS. 1-10 illustrate example techniques for facilitating the design of two-scale material structures with anisotropic properties at the course scale by geometric synthesis at the fine scale. In general, a sample material structure is subdivided into discrete elements, such as pixels (2D) or voxels (3D), and neighborhoods are defined for each discrete element. The material is homogenized and the orientation of each neighborhood is determined, thereby generating a library of reference neighborhoods representing the sample material structure. A structure is synthesized by matching the neighborhoods in the synthesized structure with reference neighborhoods having matching target orientations. The synthesized structure may be fabricated, such as by an additive manufacturing tool.

Figure 1:
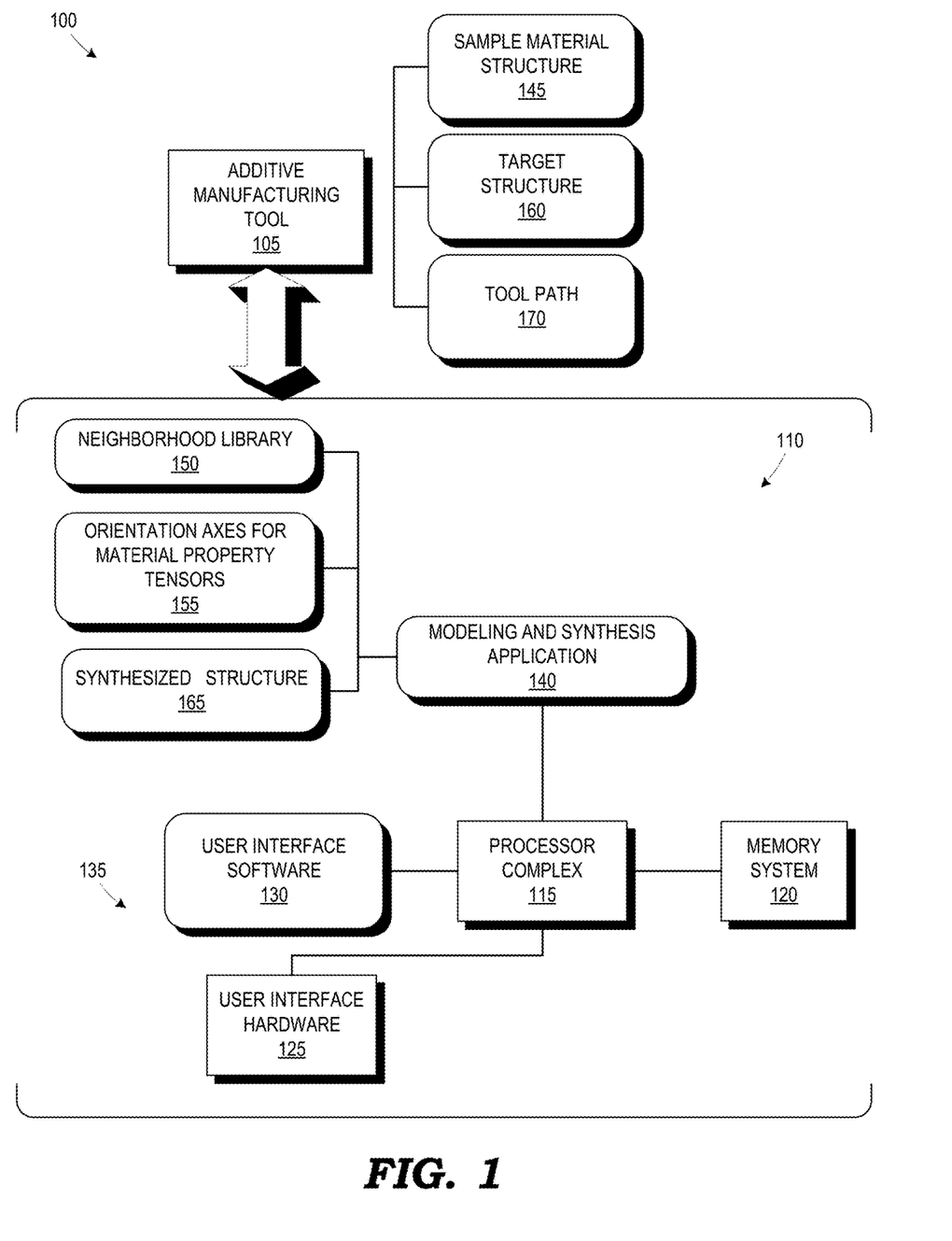
FIG. 1 is a simplified block diagram of a material modeling system in accordance with some embodiments.

The following discussion will be described as it may be implemented in an additive manufacturing environment, however, the application of the techniques described herein are not limited to such an environment. FIG. 1 is a simplified block diagram of a modeling system 100 including a manufacturing tool 105 and a computing system 110. In some embodiments, the manufacturing tool 105 may be an additive manufacturing tool, such as a 3D printer. The computing system 110 may be implemented in virtually any type of electronic computing device, desktop computer, a server, a minicomputer, a mainframe computer or a supercomputer. The present subject matter is not limited by the particular implementation of the computing system 110. The computing system 110 includes a processor complex 115 communicating with a memory system 120. The memory system 120 may include nonvolatile memory (e.g., hard disk, flash memory, etc.), volatile memory (e.g., DRAM, SRAM, etc.), or a combination thereof. The processor complex 115 may be any suitable processor known in the art, and may represent multiple interconnected processors in one or more housings or distributed across multiple networked locations. The computing system 110 may include user interface hardware 125 (e.g., keyboard, mouse, display, etc.), which together, along with associated user interface software 130, comprise a user interface 135. The processor complex 115 executes software instructions stored in the memory system 120 and stores results of the instructions on the memory system 120 to implement a modeling and synthesis application 140, as described in greater detail below.

Figure 2:
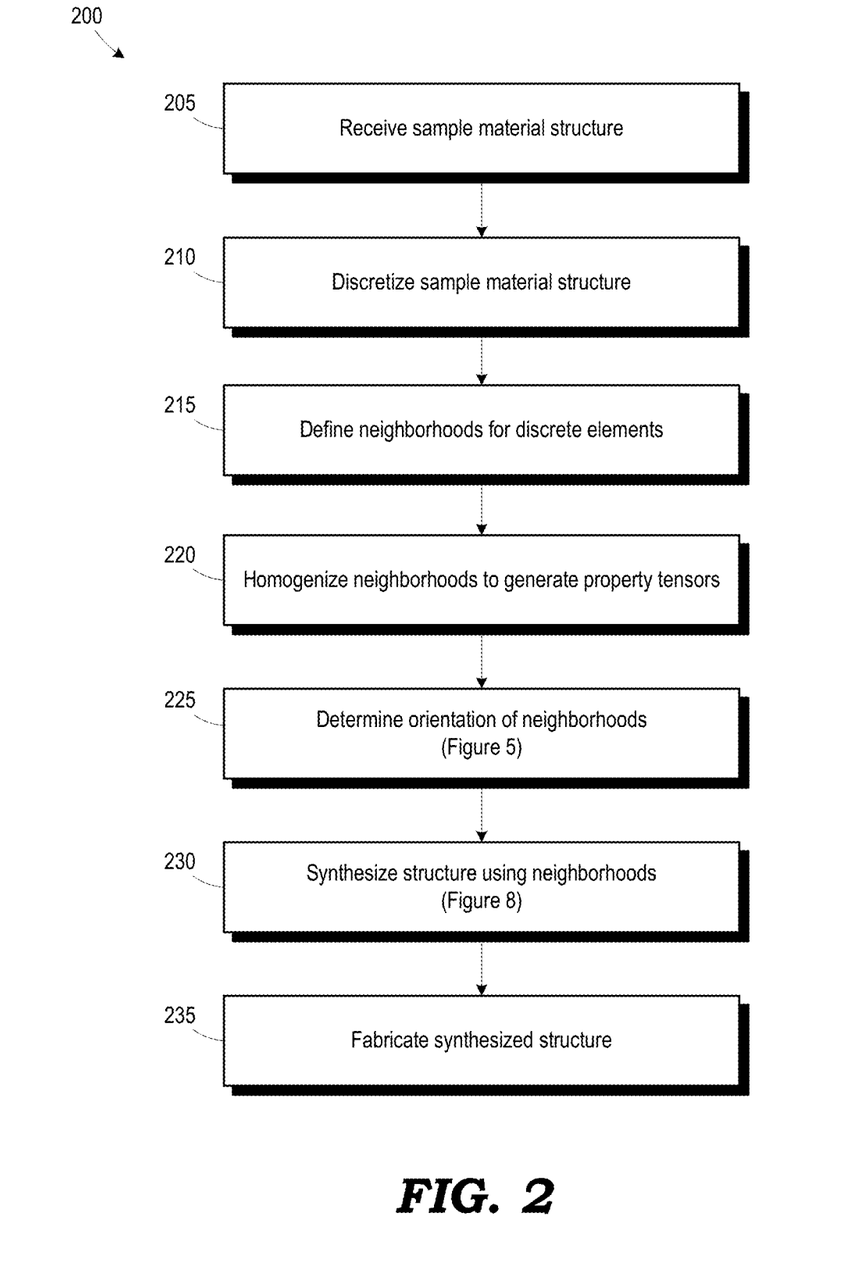
FIG. 2 is a flow diagram illustrating a method for synthesizing a two-scale structure with anisotropy in accordance with some embodiments.

FIG. 2 is a flow diagram illustrating a method 200 for synthesizing a two-scale structure with anisotropy in accordance with some embodiments. In one embodiment, the material property being modeled for controlling the syntheses of the two-scale structure is elasticity. However, it is noted that the techniques described herein also apply to other tensorial properties, such as thermal or electrical conductivity. In general, the orientation of a material may be defined by the directions of its principal axes.

Figure 3:
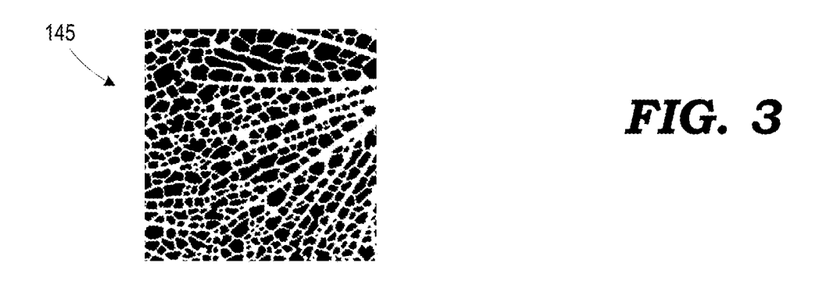
FIG. 3 is a diagram of a sample material structure in accordance with some embodiments.

In method block 205, the manufacturing tool 105 receives a sample material structure 145. FIG. 3 is a diagram of an example sample material structure 145 in accordance with some embodiments. In method block 210, the sample material structure 145 is discretized, generating a plurality of discrete elements (e.g., pixels for 2D structures or voxels for 3D structures). For purposes of illustration, a 2D example is discussed. However, a discussion regarding the extension of the techniques to a 3D structure is also provided.

In method block 215, a library 150 of reference neighborhoods is defined, where each discrete element has an associated reference neighborhood. A reference neighborhood is a set of discrete elements (e.g., rectangular grid) adjacent the selected element. The size of the neighborhood may vary. Example neighborhood sizes may be 23×23, 33×33, or 45×45. The size of the neighborhood has an impact on the computational resources necessary to implement the techniques described herein. Note that, since a neighborhood is generated for each pixel, a significant degree of overlap is present in the entries generated in the neighborhood library 150.

In method block 220, the reference neighborhoods are homogenized to generate material property tensors. The orientation of material properties can, and often will, vary from point to point. To characterize the coarse scale orientation field of the sample material structure 145, the effective material properties of each reference neighborhood in the sample material structure is evaluated at a fine scale. The process to calculate an effective material property is commonly referred to as homogenization. In one embodiment, a two-point correlation function of the material structure is employed to efficiently estimate the effective material property (e.g., elasticity) for each reference neighborhood. A two-point correlation function is a special case of an n-point correlation function, which can be defined as a probability that all vertices of a randomly tossed n-vertex polyhedron fall into the same phase of a material structure. For a heterogeneous material, the indicator function $I^{(i)}(x)$ is defined as:

$$I^{(i)}(x) = \begin{cases} 1, & \text{if } x \text{ lies in phase } i, \\ 0, & \text{otherwise.} \end{cases}$$

an n-point correlation of phase i is formulated mathematically as:

$$S_n^{(i)}(x_1, x_2, \ldots, x_n) = I^{(i)}(x_1) I^{(i)}(x_2) \ldots I^{(i)}(x_n)$$

The first moment of n-point correlation function $$S_1^{(i)}(x) = I^{(i)}(x)$$

is the volume fraction $\phi$. The second moment is a two-point correlation function:

$$S_2^{(i)}(x_1, x_2) = I^{(i)}(x_1) I^{(i)}(x_2),$$

which can be described as the probability that a randomly tossed line segment has both of its ends falling into phase i (either material phase or void phase for a porous material).

To estimate the effective material property from its two-point correlation function, the Lippmann-Schwinger equation is employed:

$$\epsilon(x) = \epsilon^0 - \int_\Omega \Gamma(x,x') \delta C(x') \epsilon(x') dx',$$

where $\epsilon$ is the strain distribution of a material structure under the constant strain $\epsilon^0$ on the coarse scale, $\Gamma$ is the second derivative of Green's function which is the impulse response of homogeneous reference material $C^0$, and $\delta C$ is the difference between the elasticity tensors of the fine scale material structure and the reference homogenization material. An effective elasticity tensor may be derived by eliminating $\epsilon$ and $\epsilon^0$:

$$C^{\text{eff}} = C^0 + \langle \delta C(x) \rangle - \langle \int_\Omega \delta C(x) \Gamma(x,x') \delta C(x') dx' \rangle + \langle \int_\Omega \int_\Omega \delta C(x) \Gamma(x,x') \delta C(x') \Gamma(x,x'') \delta C(x'') dx'' dx' \rangle - \quad (1)$$

where $\langle \ldots \rangle$ is the expectation of a function. The integrands bear the form of correlation functions. The effective elasticity tensor of the material is estimated by truncating after the first line of this equation, which is informationally equivalent to the two-point correlation function of the material.

To make this more explicit, assume a heterogeneous material has two phases, and $C^0 = C_1$ is the material property of phase 1 in a two-phase material, so that $\delta C(x) = I^{(1)}(x)(C_2 - C_1)$. The effective elasticity tensor equation (1) becomes:

$$C^{\text{eff}} = C_1 + (C_2 - C_1) \langle I^{(1)}(x) \rangle - (C_2 - C_1)^2 \langle \int_\Omega \Gamma(x,x') I^{(i)}(x) I^{(1)}(x') dx' \rangle + (C_2 - C_1)^3 \langle \int_\Omega \int_\Omega \Gamma(x,x') \Gamma(x,x'') S_3^{(1)}(x,x',x'') dx'' dx' \rangle - \quad (2)$$

which represents the elasticity tensor by a series expansion of all orders of correlation functions. The assumption may be relaxed for a material having more than two phases, but the equation will have significantly more terms.

Equations 1 and 2 allow the consideration of two different forms of inputs: (1) a detailed image of the material structure and using information that is equivalent to the two-point correlation function; or (2) the correlation function of the sample material structure 145 may be provided as the input to Equation 2. These two different types of input will result in the same estimation of the effective elasticity tensor.

In method block 225, the orientation of each of the neighborhoods is determined. The orientation of a material may be determined directly from its elasticity tensor. It is noted that the techniques described herein may be applied to other tensorial properties, such as thermal and electrical conductivity. The orientation of each reference neighborhood is determined by the directions of its principal axes.

For orthotropic material, principal axes of material are defined as the three orthogonal directions where three planes of symmetry meet. To find the principal axes of a material, the following conjecture is made: the principal axes of an orthotropic material coincide with the principal directions of the strain, which is the dominant eigentensor (eigentensor associated with the largest eigenvalue) of the material's elasticity tensor if such principal directions are uniquely defined.

Figure 4:
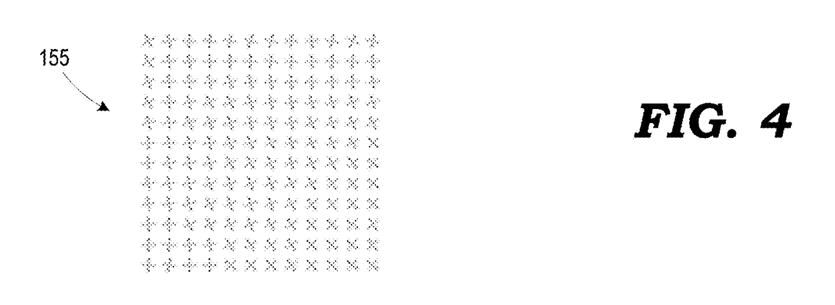
FIG. 4 is a diagram of a set of orientation axes for the material property tensors in the homogenized reference neighborhoods in the sample material structure of FIG. 3 in accordance with some embodiments.

FIG. 4 is a diagram of a set of orientation axes for the material property tensors 155 in the homogenized reference neighborhoods in the sample material structure 145 in accordance with some embodiments. Note that only a subset of non-overlapping reference neighborhoods are illustrated in FIG. 4. In the example of FIG. 4, the sample material structure 145 is porous, having material portions and void portions. For the determination of the elasticity tensors, material portions were assigned values of Young's modulus and Poisson's ratio of E=1 MPa, v=0.3, respectively, and void portions were assigned values of E=0.02 MPa, v=0.3, respectively.

Figure 5:
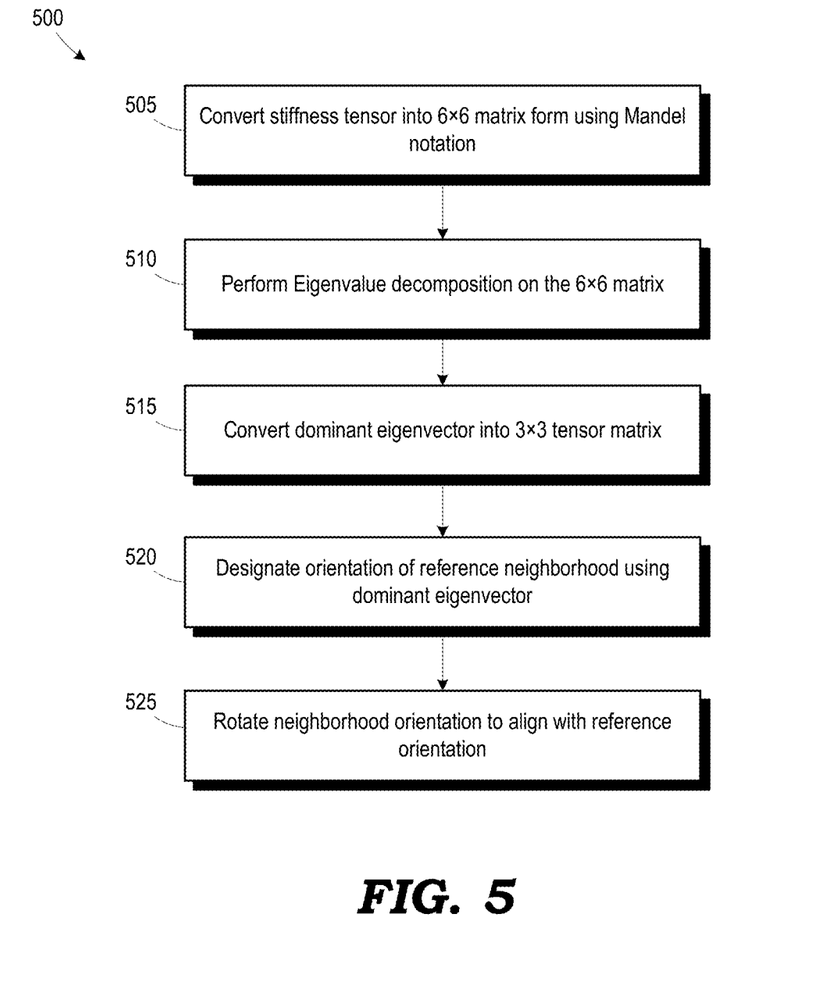
FIG. 5 is a flow diagram illustrating a method for determining reference neighborhood orientations in the method of FIG. 2 in accordance with some embodiments.

FIG. 5 is a flow diagram illustrating a method 500 for determining reference neighborhood orientations (as in FIG. 4) in accordance with some embodiments.

In method block 505, the stiffness tensor ($4^{th}$ rank) generated during the homogenization described above is converted to a 6×6 matrix using Mandel notation. An example stiffness matrix in Mandel notation is:

$$\begin{bmatrix} 0.0012 & 0.0004 & 0.0001 & 0.0001 & -0.0002 & -0.0000 \\ 0.0005 & 0.0046 & 0.0006 & 0.0016 & -0.0001 & 0.0000 \\ 0.0002 & 0.0006 & 0.0006 & 0.0005 & -0.0001 & -0.0001 \\ 0.0001 & 0.0016 & 0.0005 & 0.0015 & -0.0001 & -0.0002 \\ -0.0002 & -0.0001 & -0.0001 & -0.0001 & 0.0005 & 0.0002 \\ -0.0000 & 0.0000 & -0.0001 & -0.0002 & 0.0002 & 0.0015 \end{bmatrix}$$

In method block 510, eigenvalue decomposition is performed on the 6×6 matrix. The eigentensor of a fourth-rank tensor is defined by projecting a 3-dimensional fourth-rank anisotropic elasticity tensor (i.e., considered as a second-rank tensor in a 6-dimensional space) back into the 3-dimensional space. Eigen decomposition of an elasticity tensor provides that the eigentensor of a fourth-rank tensor in 3-dimensional space is defined by the eigenvectors of the second-rank tensor in 6-dimensional space. Since the eigenvectors of elasticity tensor in Mandel notation are strains, they may be referred to as strain eigentensors and the corresponding stress vectors may be referred to as stress eigentensors. The properties of strain and stress eigentensors follow the general properties of eigenvectors regardless of the material symmetry. For example, the stress and strain can be decomposed into a sum of six or fewer eigentensors, and the stress eigentensor is proportional to its strain eigentensor. It is also noted that dominant strain eigentensor is the unit strain that maximizes the strain energy, hence the efficiency, of the material. The corresponding Eigenvectors (columns) and Eigenvalues corresponding to the example stiffness matrix in Mandel notation are:

Eigenvectors $$\begin{bmatrix} -0.1110 & 0.0520 & 0.9437 & 0.1415 & -0.2640 & -0.0366 \\ -0.9035 & 0.1546 & -0.0250 & -0.3979 & 0.0454 & 0.0434 \\ -0.1511 & -0.1137 & 0.0494 & 0.4320 & 0.3878 & 0.7921 \\ -0.3840 & -0.2375 & -0.2529 & 0.7325 & -0.2334 & -0.3801 \\ 0.0271 & 0.2268 & -0.2007 & -0.0086 & -0.8331 & 0.4585 \\ 0.0198 & 0.9234 & 0.0454 & 0.3136 & 0.1711 & -0.1214 \end{bmatrix}$$

Eigenvalues $$\begin{bmatrix} 0.0054 & 0 & 0 & 0 & 0 & 0 \\ 0 & 0.0016 & 0 & 0 & 0 & 0 \\ 0 & 0 & 0.0012 & 0 & 0 & 0 \\ 0 & 0 & 0 & 0.0009 & 0 & 0 \\ 0 & 0 & 0 & 0 & 0.0005 & 0 \\ 0 & 0 & 0 & 0 & 0 & 0.0003 \end{bmatrix}$$

In method block 515, the dominant eigenvector is converted to a 3×3 tensor matrix. The principal directions of a strain tensor are uniquely defined when the strain is not isotropic or transverse isotropic, i.e., the three principal strains all have different numeric values. The dominant Eigenvector in 3×3 form is:

$$\begin{bmatrix} -0.1110 & 0.0140 & 0.0192 \\ 0.0140 & -0.9035 & -0.2715 \\ 0.0192 & -0.2715 & -0.1511 \end{bmatrix}$$

In method block 520, the orientation of a reference neighborhood (e.g., neighborhood orientation) is designated using the 3×3 tensor of the dominant eigenvector. For materials with isotropic and cubic symmetries, only two or three distinct eigenvalues are generally present. Four different eigenvalues are generally present for materials with transverse isotropic and hexagonal symmetries. Five different eigenvalues are generally present for materials with tetragonal symmetry. Only materials with orthotropic symmetry and no general symmetries have all six different eigenvalues. It has been observed that the largest eigenvalue of the elasticity tensor always has the multiplicity of one, meaning the eigentensor maximizing the strain energy is uniquely defined unless the strain is isotropic or transverse isotropic. In the latter case, the number of strains to maximize the strain energy is infinite. The principal orientation of the material may be determined based on the largest eigenvalue and corresponding strain eigentensor with the assumption of orthotropic symmetry. The Eigenvalue decomposition (where the columns are vectors of directions) is:

$$\begin{bmatrix} -0.0218 & -0.9645 & -0.2632 \\ 0.9512 & -0.1011 & 0.2915 \\ 0.3078 & 0.2440 & -0.9197 \end{bmatrix}$$

The Eigenvalues rank the stiffness for three directions:

$$\begin{bmatrix} 0.9917 & 0 & 0 \\ 0 & 0.1144 & 0 \\ 0 & 0 & 0.0595 \end{bmatrix}$$

In method block 525, the neighborhood orientation of each reference neighborhood is rotated to align with a reference orientation. Employing a reference orientation allows efficient matching of the reference neighborhoods during the subsequent synthesis process.

The theory of the technique employed in FIG. 5 is illustrated in the following example. The elasticity tensor of 2D orthotropic material, when its principal orientation coincides with the reference coordinate system, takes the form:

$$C = \begin{bmatrix} C_{11} & C_{12} & 0 \\ C_{12} & C_{22} & 0 \\ 0 & 0 & C_{33} \end{bmatrix}$$

For a given strain $\epsilon$, let $\theta$ be the angle between the principal orientation of the orthotropic material and the principal directions of the strain. The rotation matrix in Mandel notation is:

$$R = \begin{bmatrix} c^2 & -s^2 & -\sqrt{2}\,cs \\ s^2 & c^2 & \sqrt{2}\,cs \\ \sqrt{2}\,cs & -\sqrt{2}\,cs & -2s^2 \end{bmatrix}$$

where $c=\cos(\theta)$ and $s=\sin(\theta)$. For different relative orientations, $\theta$, the strain energy is calculated as:

$$\begin{aligned} U &= \epsilon^T R C R^T \epsilon \\ &= (\epsilon_1 c^2 + \epsilon_2 s^2)^2 C_{11} + (\epsilon_2 c^2 + \epsilon_1 s^2)^2 C_{22} + \\ &\quad 2(\epsilon_2 c^2 + \epsilon_1 s^2)(\epsilon_1 c^2 + \epsilon_2 s^2)^2 C_{12} + 2c^2 s^2 (\epsilon_1 - \epsilon_2)^2 C_{33} \end{aligned}$$

where $\epsilon = [\epsilon_1, \epsilon_2, 0]^T$ is the given strain in its principal directions.

To maximize or minimize the strain energy, the derivatives are evaluated. The partial derivative of U for a given strain with respect to $\theta$ is:

$$\begin{aligned} \frac{\partial U}{\partial \theta} &= \epsilon^T \frac{\partial R}{\partial \theta} C R^T \epsilon + \epsilon^T R C \frac{\partial R}{\partial^T} \epsilon = \\ &\quad 2\epsilon^T \frac{\partial R}{\partial \theta} C R^T \epsilon - 2\sin(2\theta)(\epsilon_1 - \epsilon_2)[\cos(2\theta)(\epsilon_1 - \epsilon_2) \\ &\quad (C_{11} - 2C_{12} + C_{22} - 2C_{33}) + C_{11}(\epsilon_1 + \epsilon_2) - C_{22}(\epsilon_1 - \epsilon_2)] \end{aligned}$$

Assuming $\partial U/\partial \theta = 0$, results in the following solutions:

$$\theta = 0° \text{ or } 90° \quad (3)$$

$$\theta = \pm \frac{1}{2} \arccos\left[\frac{C_{11}(\epsilon_1 + \epsilon_2) - C_{22}(\epsilon_1 - \epsilon_2)}{(\epsilon_1 - \epsilon_2)(C_{11} - 2C_{12} + C_{22} - 2C_{33})}\right] \quad (4)$$

where the first solution (Equation 3) implies alignment of the principal strain and the principal orientation of orthotropic material, and the second solution (Equation 4) is a non-trivial high shear case and is not always feasible. It is straightforward to show that the 0° alignment renders a higher strain energy than the 90° alignment. However, it is less straightforward to show the existence of the second solution and when it maximizes or minimizes the strain energy.

To prove the conjecture, it is shown that the second solution is not feasible when the given strain is the dominant strain eigentensor of the material's elasticity tensor. Recall that the largest eigenvalue of the elasticity tensor does not repeat itself, meaning that the unit strain to maximize the strain energy is always uniquely defined (except for the isotropic strain). Since U is an even function of $\theta$, the two results in the second solution inevitably lead to the same strain energy, which contradicts the uniqueness of the largest eigenvalue. As a result, the second solution is not feasible when the given strain is the dominant eigentensor and therefore the principal orientation of an orthotropic material coincides with the principal directions of the given strain.

Due to the number of terms involved, a closed form solution of the relative orientation to maximize or minimize the strain energy in 3D is difficult. However, it was verified that for $\alpha, \beta, \gamma, \epsilon \{0°, 90°\}$, Tait-Bryan angles representing the relative orientations between the principal directions of the given strain and principal axes of the orthotropic material are stationary points for the strain energy.

The elasticity tensor of 3D orthotropic material, when its principal orientation coincides with the reference coordinate system, takes the form:

$$\begin{bmatrix} C_{11} & C_{12} & C_{13} & 0 & 0 & 0 \\ C_{12} & C_{22} & C_{23} & 0 & 0 & 0 \\ C_{13} & C_{23} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & 0 & C_{66} \end{bmatrix}$$

Just like in 2D case, the strain energy may be calculated for different relative orientations:

$$U = \epsilon^T R C R^T \epsilon$$

where R is the rotation matrix in Mandel notation mapped from the tensor notation with the form:

$$\begin{bmatrix} 1 & 0 & 0 \\ 0 & \cos(\gamma) & -\sin(\gamma) \\ 0 & \sin(\gamma) & \cos(\gamma) \end{bmatrix} \begin{bmatrix} \cos(\beta) & 0 & \sin(\beta) \\ 0 & 1 & 0 \\ -\sin(\beta) & 0 & \cos(\beta) \end{bmatrix} \begin{bmatrix} \cos(\alpha) & -\sin(\alpha) & 0 \\ \sin(\alpha) & \cos(\alpha) & 0 \\ 0 & 0 & 1 \end{bmatrix}$$

It was verified mathematically that $\alpha, \beta, \gamma, \epsilon \{0°, 90°\}$ are indeed stationary points for the strain energy. These observations, together with the proof in 2D, validates the extension of the techniques described herein to 3D.

Most anisotropic materials are not perfectly orthotropic: some materials are only approximately orthotropic while others may share other type of material symmetry, e.g., triclinic, or no symmetry at all. The method to identify that the three orthogonal axes still applies as the Eigen decomposition of the elasticity tensor does not assume any material symmetries. Three orthogonal axes are defined as the principal axes of the material, which represents the principal directions of the unit strain maximizing the strain energy. This generalization allows the defining of the orientation of anisotropic materials.

Figure 6:
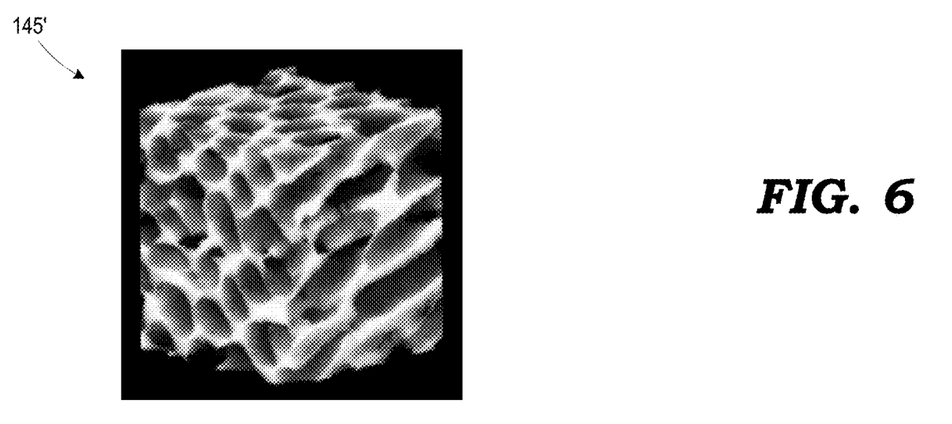
FIG. 6 is a diagram of a 3D sample material structure in accordance with some embodiments.
Figure 7:
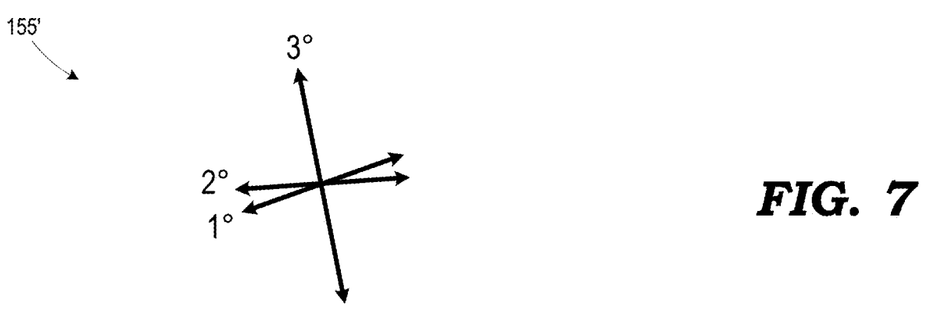
FIG. 7 is a diagram of a set of orientation axes for a material property tensor in a homogenized reference neighborhood in the sample material structure of FIG. 6 in accordance with some embodiments.

FIGS. 6 and 7 show a simplified example of the results of the technique of FIG. 5 in a 3D application. FIG. 6 is a diagram of a sample 3D material structure 145' in accordance with some embodiments. FIG. 7 is a diagram of a set of orientation axes 155' for the material property tensor in the homogenized reference neighborhood in the 3D sample material structure 145' of FIG. 6 in accordance with some embodiments. Like the 2D examples, Young's modulus and Poisson's ratio, E=1 MPa, v=0.3 and E=0.02 MPa, v=0.3 are assigned to the white and black phases, respectively. The major axis)(1° aligns with the direction of the pore and the directions of the minor and median axes (2° and 20) capture the shape of the pore.

Figure 8:
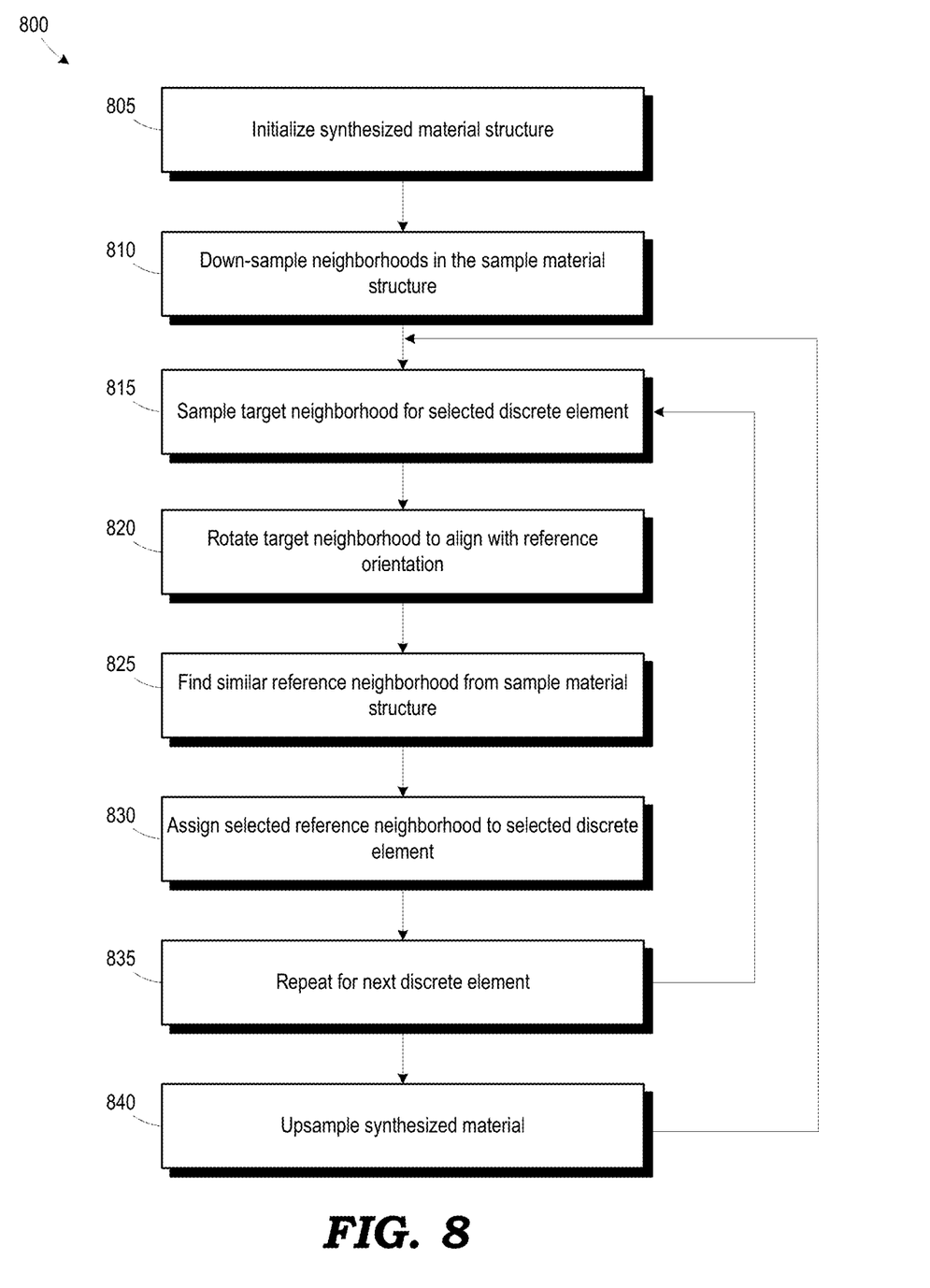
FIG. 8 is a flow diagram illustrating a method for synthesizing a structure using the reference neighborhoods in the method of FIG. 2 in accordance with some embodiments.

Returning to FIG. 2, the method 200 includes synthesizing a structure using the reference neighborhoods in method block 230. FIG. 8 is a flow diagram illustrating a method 800 for synthesizing a structure using the reference neighborhoods in method block 230 of FIG. 2 in accordance with some embodiments.

Figure 9:
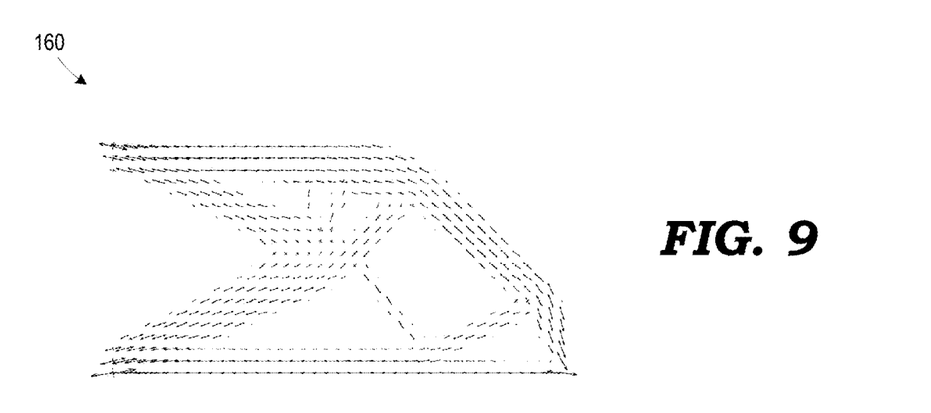
FIG. 9 is a diagram of an example target structure in accordance with some embodiments.

In general, the technique of FIG. 8 employs texture synthesis techniques to generate structures with non-uniform orientations from the sample material structure 145. In method block 805, the synthesized structure is initialized (e.g., with random noise). FIG. 9 is a diagram of an example target structure 160 (see also FIG. 1). The target structure 160 specifies a shape and set of target orientation fields for a structure to be fabricated that may be provided as an input or generated from an optimization routine.

In method block 810, the neighborhoods in the library 150 generated from the sample material structure 145 are down-sampled. Down-sampling essentially reduces the resolution of the image (e.g., neighborhood) and smooths out gaps between the removed pixels. Gaussian pyramid and correction subpasses are used to provide a parallel technique. The Gaussian pyramid is a stack of a series of images which are smoothed (blurred) by a Gaussian kernel and down-sampled. The use of a Gaussian Pyramid alleviates the computational burden without jeopardizing the actual size of the neighborhood by using a much smaller window size for comparison at different levels of resolution.

In method block 815, a target neighborhood for a particular discrete element (e.g., pixel or voxel) in the target structure 160 is sampled. The lower level Gaussian Pyramid provides a good initial guess to guide the sampling and therefore eliminate the dependency on sampling order. In this process, closer sites gain more weight than sites further apart.

In method block 820, the selected target neighborhood is rotated to align with the reference orientation. Note that the reference neighborhoods were also rotated to align with the reference orientation. During the synthesis, every reference neighborhood 150 in the sample material structure 145 may be rotated to align with the target orientation field, or, equivalently, the target neighborhood may be rotated to align with the orientation of the reference neighborhoods 150. The latter approach provides computational efficiency.

In method block 825, a reference neighborhood 150 similar to the target neighborhood is selected, and the selected reference neighborhood is assigned to the selected discrete element in method block 830.

In method block 835, the sampling in method blocks 815-830 is repeated for the next discrete element.

After finishing the sampling at the lower resolution, the result is up-sampled in method block 840 to provide a template for sampling at the higher resolution. The method 800 returns to method block 815 to repeat the sampling at the higher resolution based on the sites sampled at the lower resolution. Since the material structures are synthesized with neighborhoods up-sampled from a lower level of the image pyramid, these neighborhoods do not accurately represent the material at the current level of the Markov Random Field (MRF). Additional passes of sampling are required by using the neighborhoods from the current level of resolution. However, the concurrent resampling of all sites may lead to slow convergence or even cyclic changes because the neighbors of a site are also updating. To address this issue, multiple resampling subpasses are performed where only one site within a neighborhood is resampled in a single subpass.

Figure 10:
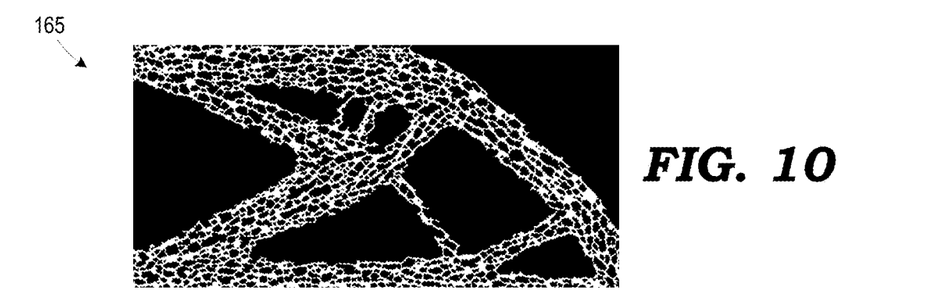
FIG. 10 is a diagram of a synthesized structure fabricated by the system of FIG. 1 in accordance with some embodiments.

FIG. 10 is a diagram of a synthesized structure 165 (see also FIG. 1) generated by the technique of FIG. 8 in accordance with some embodiments. An optimization is to minimize the structure's compliance (total strain energy, a measure of global deformation). A Solid Isotropic Microstructure with Penalization (SIMP) technique employs power law as the material interpolation scheme to relate the relative density p and Young's modulus of the material:

$$E=E_{min}+\rho^p(E_0-E_{min}), \rho \in [0,1]$$

where $E_0$ and $E_{min}$ are Young's moduli of the solid and void materials, respectively. $E_{min}$ is non-zero to avoid singularity of the finite element stiffness matrix. Power p penalizes intermediate relative density and driving the structure towards a black-and-white design on the coarse scale. The target orientation of the synthesized structure 160 is generated to follow the direction of major principal stress. Stress concentrations near the boundary conditions may be addressed by making the area near boundary conditions solid.

Returning to FIGS. 1 and 2, the synthesized structure 165 may be provided as an input to the manufacturing tool 105 to fabricate an article based thereon. In the case of an additive manufacturing tool, the manufacturing tool 105 generates a tool path 170 based on the synthesized structure 165. In method block 235, the synthesized structure 165 is fabricated. The techniques described herein can also be used toward correlating the parameters controlling the manufacturing process and the performance of the manufactured material. For example, magnetic fields have been used to control the orientation of nickel-coated graphite short fibers in a liquid matrix. In this case, the techniques described herein can be used to establish the correlation between control parameters, such as voltage or current of the electrical field, with the orientation and degree of anisotropy of the effective material properties of the composite.

In one embodiment, a method includes generating a plurality of reference neighborhoods from a sample material structure. Tensors for the plurality of reference neighborhoods associated with a material property are determined. A neighborhood orientation for each of the reference neighborhoods is determined based on the tensors. A plurality of target neighborhoods is defined for a target structure. Each target neighborhood has a target orientation associated with the material property. A synthesized structure corresponding to the target structure is generated by selecting a reference neighborhood for each target neighborhood having a neighborhood orientation matching the target orientation.

A system includes a memory to store a plurality of instructions and a processor to execute the instructions to generate a plurality of reference neighborhoods from a sample material structure, determine tensors for the plurality of reference neighborhoods associated with a material property, determine a neighborhood orientation for each of the reference neighborhoods based on the tensors, define a plurality of target neighborhoods for a target structure, each target neighborhood having a target orientation associated with the material property, and generate a synthesized structure corresponding to the target structure by selecting a reference neighborhood for each target neighborhood having a neighborhood orientation matching the target orientation.

In some embodiments, certain aspects of the techniques described herein may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM), or other non-volatile memory devices, and the like. The executable instructions stored on the non-transitory computer readable storage medium may be in source code, assembly language code, object code, or other instruction format that is interpreted or otherwise executable by one or more processors.

A non-transitory computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages and solutions to problems have been described above with regard to specific embodiments. However, the benefits, advantages, solutions to problems and any feature(s) that may cause any benefit, advantage or solution to occur or become more pronounced are not to be construed as a critical, required or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   generating a plurality of reference neighborhoods from a sample material structure;
   determining tensors for the plurality of reference neighborhoods associated with a material property;
   determining a neighborhood orientation for each of the reference neighborhoods based on the tensors;
   defining a plurality of target neighborhoods for a target structure, each target neighborhood having a target orientation associated with the material property; and
   generating a synthesized structure corresponding to the target structure by selecting a reference neighborhood for each target neighborhood having a neighborhood orientation matching the target orientation.

2. The method of claim 1, wherein generating the plurality of reference neighborhoods comprises:
   dividing the sample material structure into a plurality of discrete elements; and
   generating a reference neighborhood for each discrete element including a set of adjacent discrete elements.

3. The method of claim 1, wherein determining tensors for the plurality of reference neighborhoods comprises determining the tensors using a two-point correlation function.

4. The method of claim 1, further comprising aligning the neighborhood orientation of each reference neighborhood with a reference orientation and aligning the target orientation of each target neighborhood to align with the reference orientation prior to selecting the reference neighborhood for each target neighborhood.

5. The method of claim 1, further comprising:
   down-sampling the reference neighborhoods and the target neighborhoods prior to generating the synthesized structure;
   up-sampling the synthesized structure; and
   repeating the generating of the synthesized structure after the up-sampling.

6. The method of claim 1, further comprising:
   generating a tool path for an additive manufacturing tool based on the synthesized structure; and
   fabricating the synthesized structure in the additive manufacturing tool using the tool path.

7. The method of claim 1, further comprising:
   generating tool parameters for a manufacturing tool based on the synthesized structure; and
   fabricating the synthesized structure in the manufacturing tool using the tool parameters.

8. The method of claim 1, wherein determining the neighborhood orientation for each of the reference neighborhoods comprises:
   generating a tensor matrix for each tensor;
   determining a dominant Eigenvector of the tensor matrix; and
   determining the neighborhood orientation based on the dominant Eigenvector.

9. The method of claim 8, wherein determining the dominant Eigenvector comprises performing an Eigenvalue decomposition on the tensor matrix.

10. The method of claim 9, wherein the tensor matrix comprises a Mandel notation tensor matrix.

11. The method of claim 10, wherein the material property comprises stiffness.

12. A system, comprising:
a memory to store a plurality of instructions; and
a processor to execute the instructions to generate a plurality of reference neighborhoods from a sample material structure, determine tensors for the plurality of reference neighborhoods associated with a material property, determine a neighborhood orientation for each of the reference neighborhoods based on the tensors, define a plurality of target neighborhoods for a target structure, each target neighborhood having a target orientation associated with the material property, and generate a synthesized structure corresponding to the target structure by selecting a reference neighborhood for each target neighborhood having a neighborhood orientation matching the target orientation.

13. The system of claim 12, wherein the processor is to generate the plurality of reference neighborhoods by dividing the sample material structure into a plurality of discrete elements and generating a reference neighborhood for each discrete element including a set of adjacent discrete elements.

14. The system of claim 12, wherein the processor is to determine tensors for the plurality of reference neighborhoods using a two-point correlation function.

15. The system of claim 12, wherein the processor is to align the neighborhood orientation of each reference neighborhood with a reference orientation and align the target orientation of each target neighborhood to align with the reference orientation prior to selecting the reference neighborhood for each target neighborhood.

16. The system of claim 12, wherein the processor is to down-sample the reference neighborhoods and the target neighborhoods prior to generating the synthesized structure, up-sample the synthesized structure, and repeat the generating of the synthesized structure after the up-sampling.

17. The system of claim 12, further comprising a manufacturing tool to fabricate the synthesized structure, wherein the processor is to generate a tool path for the manufacturing tool based on the synthesized structure, and the manufacturing tool is to fabricate the synthesized structure using the tool path.

18. The system of claim 12, further comprising a manufacturing tool to fabricate the synthesized structure, wherein the processor is to generate tool parameters for the manufacturing tool based on the synthesized structure, and the manufacturing tool is to fabricate the synthesized structure in the manufacturing tool using the tool parameters.

19. The system of claim 12, wherein the processor is to determine the neighborhood orientation for each of the reference neighborhoods by generating a tensor matrix for each tensor, determining a dominant Eigenvector of the tensor matrix, and determining the neighborhood orientation based on the dominant Eigenvector.

20. The system of claim 19, wherein the processor is to determine the dominant Eigenvector by performing an Eigenvalue decomposition on the tensor matrix.

21. The system of claim 20, wherein the tensor matrix comprises a Mandel notation tensor matrix.

22. The system of claim 12, wherein the material property comprises stiffness.

* * * * *